United States Patent [19]

Cowles

[11] Patent Number: 4,660,597
[45] Date of Patent: Apr. 28, 1987

[54] FUEL PRESSURE REGULATOR

[75] Inventor: Warren H. Cowles, Farmington Hills, Mich.

[73] Assignee: Colt Industries Operating Corp, New York, N.Y.

[21] Appl. No.: 748,914

[22] Filed: Jun. 26, 1985

[51] Int. Cl.$^4$ ............................................. F16K 31/12
[52] U.S. Cl. ........................... 137/505.42; 137/505.39; 137/522; 251/368
[58] Field of Search ...................... 137/505.42, 505.41, 137/505.39, 505.38, 505, 522; 251/368

[56] References Cited

U.S. PATENT DOCUMENTS

| 2,612,728 | 10/1952 | Jacobsson | 137/505.42 |
| 2,650,455 | 9/1953 | Jacobsson | 137/505.42 |
| 3,514,231 | 5/1970 | Belden | 137/855 X |
| 3,547,143 | 12/1970 | Mills | 137/505.42 X |
| 3,566,509 | 3/1971 | Caparone | 137/505.41 X |
| 3,572,375 | 3/1971 | Rosenberg | 137/852 X |
| 3,612,618 | 10/1971 | Swanson | 137/505.42 X |
| 4,196,886 | 4/1980 | Murray | 251/368 X |
| 4,251,053 | 2/1981 | Wurzer | 137/855 X |

FOREIGN PATENT DOCUMENTS

718192  1/1932  France ............................. 137/505.42

Primary Examiner—Harold W. Weakley
Attorney, Agent, or Firm—Walter Potoroka, Sr.

[57] ABSTRACT

A fuel pressure regulator is shown as having two distinct and variable chambers sharing, as a common wall therebetween, a pressure responsive diaphragm which controls the position of a valve actuator depending upon the pressure differential existing across the diaphragm with such pressure differential being reflective of the pressure differential existing as from the magnitude of the pressure of the fuel in a first of the two chambers to the magnitude of the pressure within the second of the two chambers which is at ambient atmospheric pressure; a flapper type valve openable by the valve actuator serves to control the flow of fuel into the first of the two chambers from where the pressure regulated fuel flows as to associated fuel metering apparatus.

11 Claims, 13 Drawing Figures

FUEL PRESSURE REGULATOR

FIELD OF THE INVENTION

This invention relates generally to fuel pressure regulators and more particularly to throttling type of pressure regulators employable as with fuel metering systems and apparatus for metering fuel flow to an associated combustion engine.

BACKGROUND OF THE INVENTION

Even though the automotive industry has over the years, if for no other reason than seeking competitive advantages, continually exerted efforts to increase the fuel economy of automotive engines, the gains continually realized thereby have been deemed by various levels of governing or regulatory bodies as being insufficient. Further, such levels of governing or regulatory bodies have also arbitrarily imposed regulations specifying the maximum permissible amounts of carbon monoxide (CO), hydrocarbons (HC) and oxides of nitrogen ($NO_x$) which may be emitted by the engine exhaust gases into the atmosphere.

Unfortunately, generally, the available technology employable in attempting to attain increases in engine fuel economy is contrary to that technology employable in attempting to meet legally imposed standards on exhaust emissions.

For example, the prior art in trying to meet the standards for $NO_x$ emissions has employed a system of exhaust gas recirculation whereby at least a portion of the exhaust gas is reintroduced into the cylinder combustion chamber to thereby lower the combustion temperature therein and consequently reduce the formation of $NO_x$.

The prior art has also proposed the use of engine crankcase recirculation means whereby the vapors which might otherwise become vented to the atmosphere are introduced into the engine combustion chambers for further burning.

The prior art has also proposed the use of fuel metering means which are effective for metering a relatively overly rich (in terms of fuel) fuel-air mixture to the engine combustion chamber means as to thereby reduce the creation of $NO_x$ within the combustion chamber. The use of such overly rich fuel-air mixtures results in a substantial increase in CO and HC in the engine exhaust which, in turn, requires the supplying of additional oxygen, as by an associated air pump, to such engine exhaust in order to complete the oxidation of the CO and HC prior to its delivery into the atmosphere.

The prior art has also heretofore proposed employing the retarding of the engine ignition timing as a further means for reducing the creation of $NO_x$. Also, lower engine compression ratios have been employed in order to lower the resulting combustion temperature within the engine combustion chamber and thereby reduce the creation of $NO_x$. In this connection the prior art has employed what is generally known as a dual bed catalyst. That is, a chemically reducing first catalyst is situated in the stream of exhaust gases at a location generally nearer the engine while a chemically oxidizing second catalyst is situated in the stream of exhaust gases at a location generally further away from the engine and downstream of the first catalyst. The relatively high concentrations of CO resulting from the overly rich fuel-air mixture are used as the reducing agent for $NO_x$ in the first catalyst while extra air supplied (as by an associated pump) to the stream of exhaust gases, at a location generally between the two catalysts, serves as the oxidizing agent in the second catalyst. Such systems have been found to have various objections in that, for example, they are comparatively very costly requiring additional conduitry, air pump means and an extra catalyst bed. Further, in such systems, there is a tendency to form ammonia which, in turn, may or may not be reconverted to $NO_x$ in the oxidizing catalyst bed.

The prior art has also proposed the use of fuel metering injection means for eliminating the usually employed carbureting apparatus and, under superatmospheric pressure, injecting the fuel through individual nozzles directly into the respective cylinders of a piston type internal combustion engine. Such fuel injection systems, besides being costly, have not proven to be generally successful in that the system is required to provide metered fuel flow over a very wide range of metered fuel flows. Generally, those prior art injection systems which are very accurate at one end of the required range of metered fuel flows, are relatively inaccurate at the opposite end of that same range of metered fuel flows. Also, those prior art injection systems which are made to be accurate in the mid-portion of the required range of metered fuel flows are usually relatively inaccurate at both ends of that same range. The use of feedback means for altering the metering characteristics of such prior art fuel injection systems has not solved the problem of inaccurate metering because the problem usually is intertwined within such factors as: effective aperture area of the injector nozzle; comparative movement required by the associated nozzle pintle or valving member; inertia of the nozzle valving member; and nozzle "cracking" pressure (that being the pressure at which the nozzle opens). As should be apparent, the smaller the rate of metered fuel flow desired, the greater becomes the influence of such factors thereon.

It is anticipated that the said governing bodies will be establishing even more stringent exhaust emission limits.

The prior art, in view of such anticipated requirements with respect to $NO_x$, has suggested the employment of a "three-way" catalyst, in a single bed, within the stream of exhaust gases as a means of attaining such anticipated exhaust emission limits. Generally, a "three-way" catalyst is a single catalyst, or catalyst mixture, which catalyzes the oxidation of hydrocarbons and carbon monoxide and also the reduction of oxides of nitrogen. It has been discovered that a difficulty with such a "three-way" catalyst system is that if the fuel metering is too rich (in terms of fuel), the $NO_x$ will be reduced effectively but the oxidation of CO will be incomplete; if the fuel metering is too lean, the CO will be effectively oxidized but the reduction of $NO_x$ will be incomplete. Obviously, in order to make such a "three-way" catalyst system operative, it is necessary to have very accurate control over the fuel metering function of associated fuel metering supply means feeding the engine. As hereinbefore described, the prior art has suggested the use of fuel injection means, employing respective nozzles for each engine combustion chamber, with associated feedback means (responsive to selected indicia of engine operating conditions and parameters) intended to continuously alter or modify the metering characteristics of the fuel injection means. However, as also hereinbefore indicated, such fuel injection systems have not proven to be successful.

It has also heretofore been proposed to employ fuel metering means, of a carbureting type, with feedback means responsive to the presence of selected constituents comprising the engine exhaust gases. Such feedback means were employed to modify the action of a main metering rod of a main fuel metering system of a carburetor. However, tests and experience have indicated that such a prior art carburetor and such a related feedback means apparently will never provide the degree of accuracy required in the metering of fuel to an associated engine as to assure meeting, for example, the said anticipated exhaust emission standards.

It is believed that many of such prior art proposals and apparatus would, at least, have significantly improved operation if more accurate and responsive fuel pressure regulator means were employed in combination therewith.

Accordingly, the invention as disclosed, described and claimed is directed, primarily, to the solution of such and other related and attendant problems of the prior art.

SUMMARY OF THE INVENTION

According to the invention, a fluid pressure regulator comprises two distinct and variable chamber means separated by wall means therebetween, said wall means comprising pressure responsive movable wall means, variably positionable valve actuator means, inlet valve means movable to and from opened and closed positions for controlling the flow of said fluid into a first of said two chamber means, and passage means for communicating a reference pressure to a second of said two chamber means, said pressure responsive means at times being effective to cause said valve actuator means to in turn cause said inlet valve means to become opened, said inlet valve means comprising an elastomeric valving portion partially separated from and partially joined to an associated supporting body structure, said valving portion being joined to said supporting body structure by an integrally formed elastomeric portion, whereby when said valving portion is moved to and from said opened and closed positions said valving portion undergoes a hinged-like motion generally about said elastomeric portion.

Various objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENT

Figure 1:
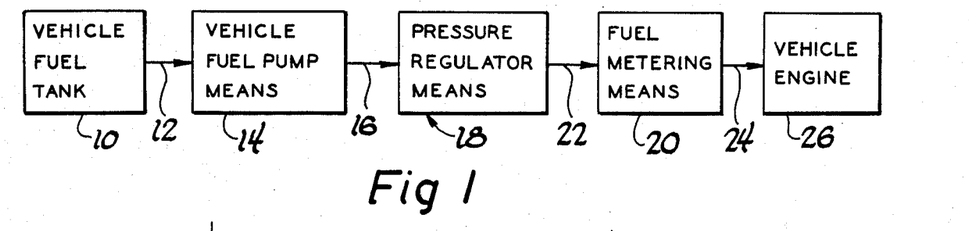
FIG. 1 is a diagrammatic illustration of an engine fuel supply and metering system employing a fluid pressure regulator according to the invention.

Referring now in greater detail to the drawings, FIG. 1 diagrammatically illustrates a vehicular fuel tank 10 which, via passage means 12, supplies fuel to associated vehicular fuel pump means 14 which, in turn, via passage means 16, supplies fuel, at an unregulated pressure, to pressure regulating means 18. Associated fuel metering means 20 receives fuel at a regulated pressure via passage means 22 and, in turn, supplies such (regulated pressure) fuel via delivery means 24 to associated vehicular engine means 26.

Figure 2:
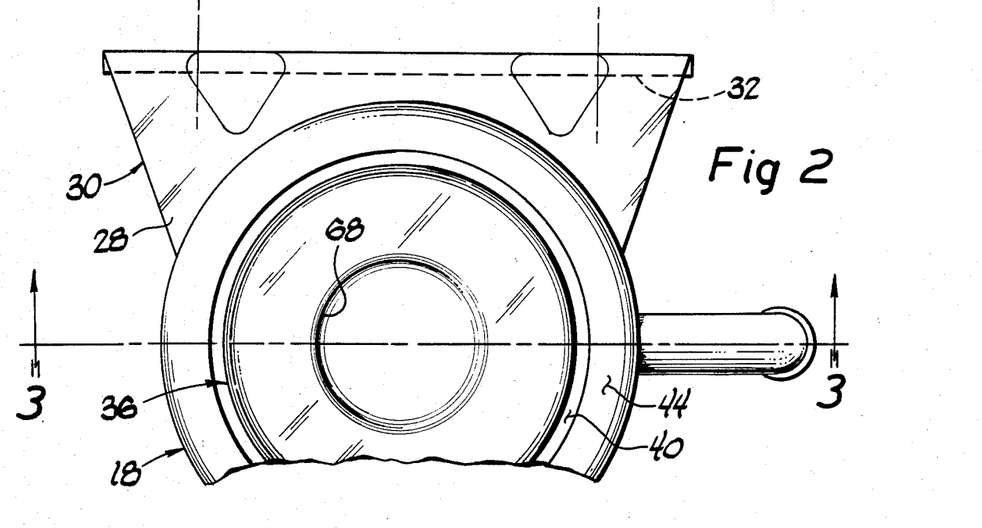
FIG. 2 is a top plan view, with portions broken away, of a pressure regulator employing teachings of the invention.
Figure 3:
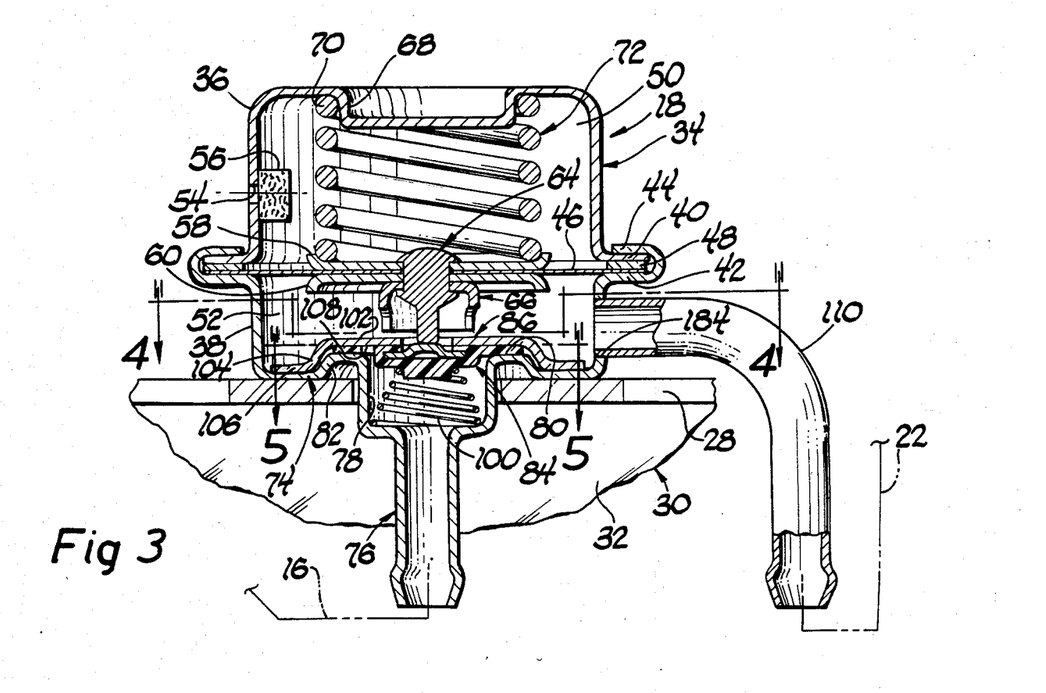
FIG. 3 is an axial cross-sectional view taken generally on the plane of line 3—3 of FIG. 2 and looking in the direction of the arrows.

In FIGS. 2 and 3, the pressure regulator means 18 is illustrated as being suitably secured, for example, as by welding to one arm 28 of a support bracket 30 which may have its other arm 32, in turn, suitably secured as to the engine 26.

In the preferred embodiment, the pressure regulating means 18 is depicted in FIG. 3 as comprising housing means 34 which may be formed of an upper inverted cup like housing section 36 and a lower cup-like housing section 38. The upper housing section 36 may be provided with an annular outwardly radiating flange portion 40 which is employed for being operatively secured to the lower housing section 38 which has an annular outwardly radiating flange portion 42 and a continuous extension 44 thereof which, as is well known in the art, may be rolled over as to bear against and clamp the flange 40 of upper housing section 36.

A pressure responsive movable diaphragm or wall means 46 is preferably provided with an annular gasket 48 generally peripherally about diaphragm means 46. Preferably the gasket means 48 is sealingly cemented to diaphragm means 46. As best seen in FIG. 3, an outer annular portion of diaphragm means 46 and gasket 48 are contained and retained between flange portions 40 and 42 through the compressive force developed during the spinning or rolling-over of the flange extension 44 against flange 40.

Diaphragm means 46, among other things serves to define two variable and distinct chambers 50 and 52 within housing means 34. Chamber means 50 is at a reference pressure which, in the embodiment disclosed may be ambient atmospheric pressure communicated to chamber means 50 as by passage means 54 formed through a wall portion of upper housing section 36. A cooperating filter means 56 is preferably provided in order to prevent the entry of foreign matter into chamber 50; such filter means 56 may be situated within chamber 50 and suitably secured to the interior of housing section 36, in series with passage 54, as by, for example, cementing.

Diaphragm means 46 is provided with oppositely disposed diaphragm backing plates 58 and 60 which are held together in an assembled condition by the main body portion 62 of a valve actuator 64 which also serves to retain a stop member 66 in assembled relationship as against backing plate 60. Preferably, the upper end of housing section 36 is formed with an inwardly extending cylindrical-like portion 68 which serves to locate one end 70 of spring means 72 the other end of which is in operative engagement with backing plate 58.

The lower end wall 74 of housing section 38 is formed to provide inlet conduit means 76 which, as indicated in FIG. 1, may be placed in communication with passage or conduit means 16. Inlet conduit means 76 is preferably formed to provide a relatively enlarged cylindrical portion 78 which, in the embodiment illustrated, extends generally inwardly of chamber 52 and effectively blends into an axially transverse annular surface 80 which, as through an integrally formed annular wall portion 82, join the radially outer portion of end wall 74.

Figure 4:
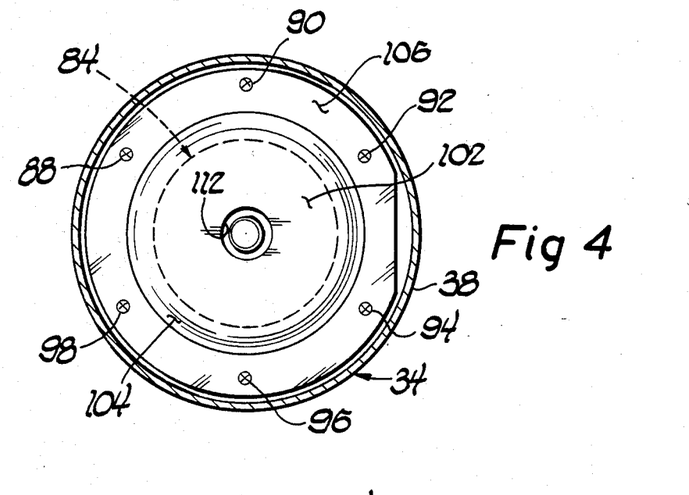
FIG. 4 is a cross-sectional view taken generally on the plane of line 4—4 of FIG. 3 and looking in the direction of the arrows.

A flapper valve assembly 84 has its radially outer portion seated against annular surface 80 and sealingly retained thereagainst by an upper disposed plate member 86 which may be secured to housing section 38 as by a plurality of spot welds as generally depicted at 88, 90, 92, 94, 96 and 98 of FIG. 4. A spring 100 situated in chamber 78 serves to continually resiliently urge the valving means of the flapper valve assembly toward a closed position.

As can be seen in both FIGS. 3 and 4, the plate member 86 has a generally disk-like upper main body portion 102 which, through an integrally formed generally conical portion 104 interconnects to an outwardly radiating annular flange portion 106. The undersurface 108, of main body portion 102, sealingly engages the annular outer peripheral portion of the flapper valve assembly 84 and serves as a valving seat for the valve portion of the flapper valve assembly 84. As shown in both FIGS. 3 and 4, the main body portion 102 has an aperture or passage 112 formed therethrough.

An outlet conduit 110 communicates at one end with chamber means 52 and at its other end as with passage or conduit means 22.

Figure 5:
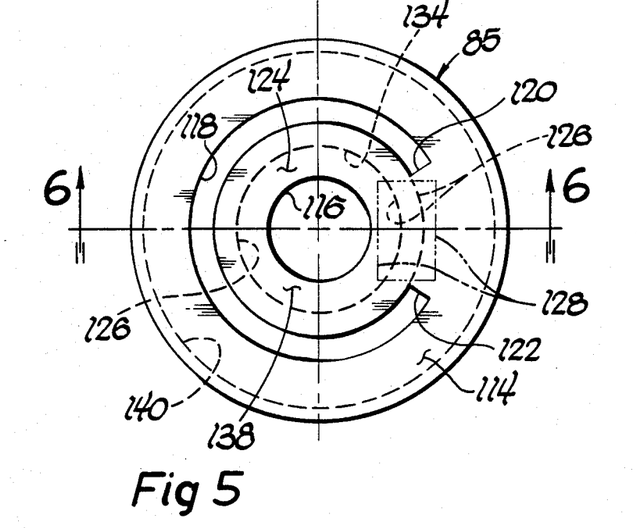
FIG. 5 is a relatively enlarged view taken generally on the plane of line 5—5 of FIG. 3, with certain elements not shown for clarity, and looking in the direction of the arrows.
Figure 6:
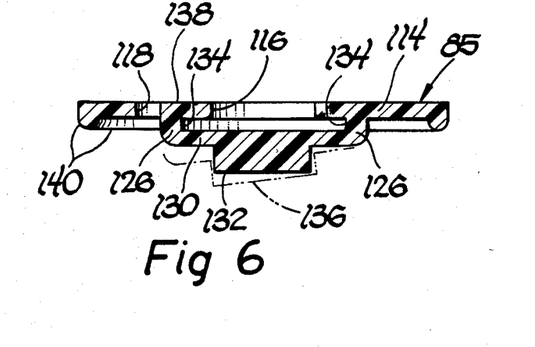
FIG. 6 is an axial cross-sectional view taken generally on the plane of line 6—6 of FIG. 5 and looking in the direction of the arrows.

Referring in greater detail to FIGS. 5 and 6, the flapper valve 85 is preferably a member molded of an elastomeric material such as, for example, "Viton". "Viton" is a registered United States of America trademark, of the Du Pont de Nemours, E.I. & Co. of Wilmington, Del. United States of America, for a series of fluoroelastomers based on the copolymer of vinylidene fluoride and hexafluoropropylene, with the repeating structure possibly —$CF_2$—$CH_2$—$CF_2$—$CF(CF_3)$—. As best seen in FIG. 5 the main body portion 114 of flapper valve means 85 is of a disk-like configuration having a centrally situated opening 116 formed therethrough. A second opening 118 is also formed through the main body portion 114 and, as best seen in FIG. 5, is generally concentric to passage or opening 116. The opening 118 is of a slot-like configuration which circumscribes most of aperture 116 as to have ends 120 and 122 spaced from each other. This, in effect, causes that portion 124 of the main body portion 114 which is generally between the almost full-circle slot 118 and aperture 116 to be disconnected from the remainder of the main body portion 114 except for the remaining integrally formed downwardly extending cylindrical wall portion 126. More particularly such remaining integrally formed wall portion 126 would exist generally in the area bound by the phantom line box 128 which is provided only to better explain where such remaining integrally formed wall portion 126 would exist and therefore function as an elastomeric hinge or flexural connection.

The cylindrical wall 126, in turn, is integrally formed with an axially transverse end wall 130 which, in turn, is integrally formed with a generally solid cylindrical axial extension 132. As a consequence of the location of cylindrical wall 126 with respect to opening 116, an annular recess 134 is formed generally between end wall 130 and a portion of the main body 114 situated generally above said end wall 130. As generally, and fragmentarily, depicted in phantom line at 136 of FIG. 6, the valving portion, in the main comprised of said portion 124, wall 126 and end wall 130 during opertion will "flap" or articulate about said elastomeric hinge or flexural connection. The upper surface 138 of portion 124 comprises the valving surface and when such is seated or engaged against the underside 108, of member 86 (FIG. 3), which serves as a valve seating surface, the valving portion is effectively closed and fluid flow through the valving means is terminated. Further, in the preferred embodiment, member 85 is provided with an annular sealing bead 140 formed integrally with the body 114 as to be at the underside of body 114 and generally adjacent the periphery thereof.

Figure 7:
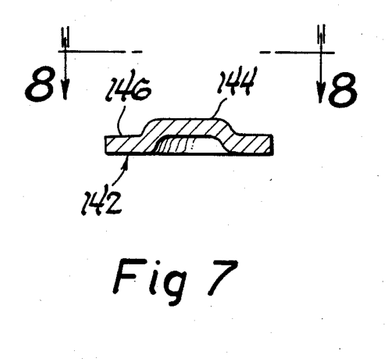
FIG. 7 is a correspondingly relatively enlarged axial cross-sectional view of one of the elements shown in FIG. 3.
Figure 8:
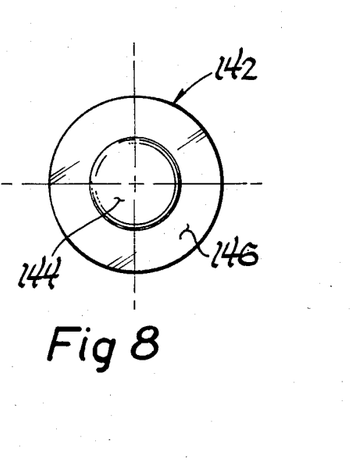
FIG. 8 is a view taken generally on the plane of line 8—8 of FIG. 7 and looking in the direction of the arrows.

Referring in greater detail to FIGS. 7 and 8, a valve insert 142, formed as of cold rolled steel or any other suitable material, is illustrated as being of disk-like configuration, when viewed in FIG. 8, and having centrally located generally circular indentation or raised portion 144 so as to result in a generally lower disposed (as viewed in FIG. 7) outwardly radiating annular flange portion 146. The valve insert 142 is intended to be inserted into and retained by member 85 as by inserting the flange 146 into the annular recess 134 of member 85 thereby resulting in the raised portion 144 being situated in the clearance aperture 116 of flapper valve means 85 to thereby comprise the flapper valve assembly 84 as depicted in FIG. 3.

Figure 9:
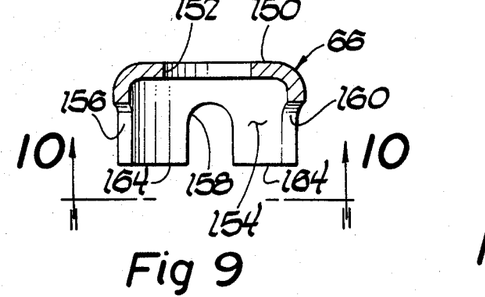
FIG. 9 is a correspondingly relatively enlarged axial cross-sectional view of one of the elements shown in FIG. 3.
Figure 10:
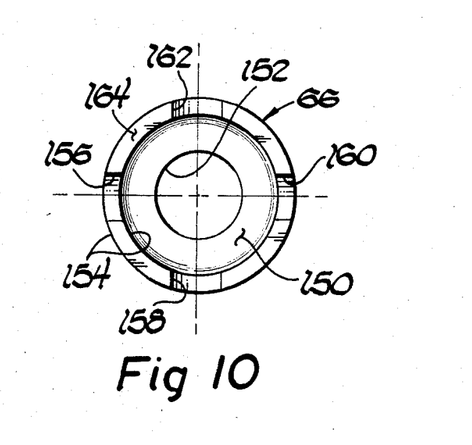
FIG. 10 is a view taken generally on the plane of line 10—10 of FIG. 9 and looking in the direction of the arrows.

Referring in greater detail to FIGS. 9 and 10, the stop member 66, which may be formed of cold rolled steel or any other suitable material, is depicted as being of generally cylindrical cup-shaped configuration with an axially transverse end wall 150, having an aperture 152 formed therethrough, integrally formed with the cylindrical side wall 154 which, in turn, has a plurality of openings 156, 158, 160 and 162 formed therethrough. The open end of the side wall 154 terminates in abutment or stop surface means 164.

Figure 11:
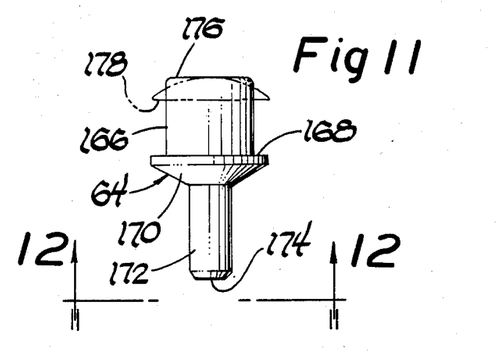
FIG. 11 is a correspondingly relatively enlarged elevational view of one of the elements shown in FIG. 3.
Figure 12:
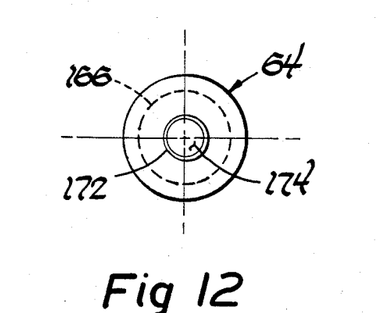
FIG. 12 is a view taken generally on the plane of line 12—12 of FIG. 11 and looking in the direction of the arrows.

Referring in greater detail to FIGS. 11 and 12, the valve actuator member 64, which may be formed of cold rolled steel or any other suitable material, is illustrated as comprising a main body portion 166 which has an outwardly radiating flange portion 168 and an inwardly tapering transitional portion 170 joining an axial extension 172, of relatively reduced cross-sectional diameter, terminating in an end abutment surface 174. Referring also to FIG. 3, upon assembly, the body 166 of actuator 64 is closely received through aperture 152 of stop member 66 and through respective apertures formed through diaphragm backing plate 60, diaphragm 46 and diaphragm backing plate 58 at which time the upper end 176 (FIG. 11) of actuator body 166 is suitably swaged or otherwise formed-over to assume a configuration as generally depicted in phantom line 178 in FIG. 11 and in solid line in FIG. 3 thereby holding such elements 58, 46, 60, 66 and 64 in assembled relationship.

Figure 13:
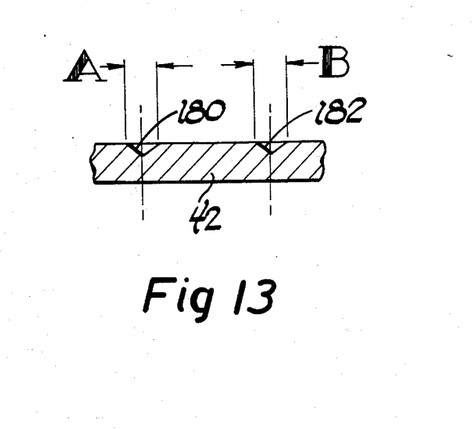
FIG. 13 is a relatively enlarged cross-sectional view of a fragmentary portion of the housing means shown in FIG. 3.

FIG. 13, in enlarged scale, illustrates the preferred form of the flange portion 42 of housing section 38. More particularly, in the preferred embodiment a plurality of generally concentric annular grooves or recesses 180 and 182 are formed in what, during assembled condition, would be considered the inner surface of flange 42. Although such recesses 180 and 182 may be of any suitable cross-sectional configuration, in the embodiment disclosed such are of a V-like configuration each having a depth in the order of 0.012 inch and a width, as represented by each of A and B, in the order of 0.035 inch. Such circular grooves 180 and 182 serve to provide an enhanced gripping action on the diaphragm assembly when in assembled condition as depicted in FIG. 3.

After the various described elements and sub-assemblies are formed, the overall pressure regulator assembly 18 may be assembled as by brazing, welding or soldering conduit 110 within aperture 184 of housing section 38. The spring 100 may be placed within chamber or enlargement 78 and the flapper valve assembly 84 placed atop surface 80 as to have its extension 132 in effect serve as a pilot for the upper end of spring 100. The plate member 86, placed atop the flapper valve assembly 84 may then be spot welded to the end wall 74 of lower housing section 38. The filter 56 may be cemented to the interior of upper housing section 36 and the spring 72 placed within housing section 36 as to be piloted at one end by portion 68. Such two housing sections, with their respective components are then brought together as to cooperatively engage the generally peripheral portion of diaphragm means 46 and gasket 48 (such being a portion of a previously assembled sub-assembly comprising elements 58, 48, 46, 60, 64 and 66) and compressively retain such as by the clamping action of the rolled-over extension 44 of flange 42.

OPERATION OF INVENTION

When the pressure of the fuel within chamber 52 attains a preselected magnitude the force developed thereby against the effective projected area of diaphragm means 46 is sufficient to overcome the pre-load and spring rate of spring means 72, along with the force developed by the reference pressure (as for example ambient atmosphere) in chamber 50, and cause such to move upwardly (as viewed in FIG. 3) to permit spring 100 to move and close the flapper valve closed against valve seating surface 108. Preferably, the pre-load of spring 100 may be almost negligible when the flapper valve is closed because of the relatively higher pressure of the fuel upstream of the closed flapper valve tending to hold it closed. Also the spring rate of spring 100 may be of a relatively very low rate and as such exhibit almost a negligible effect in tending to move the actuator 64 and related diaphragm means against the resilient resistance of spring means 72.

For purposes and ease of description, let it be assumed that there is no fuel in either conduit 110, chamber 52 or conduit means 76. At this time, spring 72 will have moved diaphragm 46 and actuator 64 downwardly against the insert 142 of the flapper valve assembly 84 and caused the opening thereof as to a position which may be considered depicted at 136 of FIG. 6. Such downward movement of the spring 72 and actuator 64 and the corresponding opening movement of flapper valve assembly 84 continues until the abutment surface 164 of stop member 66 abuts against the upper surface of portion 102 of stop plate 86.

If under such assumed conditions fuel is supplied by the vehicular fuel pump means 14, such fuel will flow through inlet conduit means 76 and between opened valve seat surface 108 and opened valving surface 138 of opened valving portion 124 and continue its flow through aperture or passage 112 and openings 156, 158, 160 and 162 of stop member 66 into chamber means 52. Such flow will continue into chamber means 52 and from there into and through conduit 110, as to the associated fuel metering means 20, and as such flow continues the pressure of the fuel within conduit 110 and chamber 52 will start to increase.

When the pressure of the fuel within chamber 52 increases sufficiently, the resulting force thereof will start to move diaphragm means 46 and actuator 64 upwardly against the resilient resistance of spring 72 thereby enabling spring 100 to accordingly move the valving portion 124 toward its cooperating seating surface on member 86. Eventually, as the fuel pressure within chamber 52 continues to increase (and the diaphragm means 46 and actuator 64 correspondingly further moved against the resistance of spring means 72) a preselected magnitude of pressure will be attained within chamber 52. When such preselected magnitude of pressure is attained diaphragm means 46 and actuator 64 will have been moved a sufficient distance against spring 72 as to permit valving surface 138 of valving portion 124 (FIGS. 5 and 6) to sealingly seat against the cooperating valve seating surface 108 thereby, at that time, terminating fuel flow to the chamber 52.

As soon as the pressure of the fuel within chamber 52 decreases (from the preselected magnitude thereof), spring 72 starts to move diaphragm 46 and valve actuator 64 downwardly to again open the valving portion 124 of the flapper valve assembly 84 thereby again increasing fuel flow and fuel pressure. During operation, the valving portion 124 is, in effect, constantly moving toward and away from a closed position to thereby regulate the pressure of the fuel in chamber 52. Generally, during engine operating conditions requiring a comparatively low rate of fuel flow the valving portion 124 will be moved in the opening direction a distance less than if the engine demands were such as to require relative high rates of fuel flow. Similarly, during such conditions of low rate of fuel flow to the engine, the valving portion 124 will be in an open (or partially open) condition for shorter cycle times than if the engine demands required high rates of fuel flow. Calibration of the pressure regulator 18 and establishment of the proper spring pre-load of spring 72 is achieved by the controlled axially inward deformation of the end wall of housing section 36 while a fluid would be flowed therethrough and the pressure of fluid as within chamber 52 observed and gauged.

Although believed to be apparent in view of the foregoing disclosure, it should be made positively clear that the invention provides many advantages over the prior art. For example, the flapper valve portion 124 is hinged, as by a portion of wall 126, and therefore requires no cooperating valve guide, as is often the case in the prior art, thereby reducing (if not eliminating) friction as occurs in the guided prior art valves and totally eliminates the need for accurate concentric dimensions as required in the prior art as between the valve and valve guide. The flapper valve static seal is the outer generally concentric ring-like portion (secured between member 86 and surface 80) which is integrally molded with the flapper valve portion 124 thereby reducing cost. The flat valve seat surface 108 is a surface formed on the member 86 which is a flat metal stamping and, again, relatively inexpensive. Because of the preferably low durometer of the material comprising the flapper valve portion 124, as for example, "Viton", a positive fuel shut-off is provided as between the flapper valve portion 124 and cooperating flat seat 108. The metal disk 142 within the flapper valve portion 124 provides a hard and durable member against which the valve actuator can abut without in any way harming the elastomeric material comprising the flapper valve portion 124. Further, such metal disk insert 142, when inserted into the flapper valve recess 134, provides both axial and lateral or transverse stability to the flapper valve portion 124 so that fluid pressure surges will not deform the valve portion 124 when it is on its coacting seating surface 108 and cause leakage therepast. The stop member 66 prevents excessive travel of both the diaphragm 46 and flapper valve portion 124. Further, the prior art often employs a steel ball valve or other form of steel valve and such because of their mass are sensitive to vibrations induced into the prior art pressure regulators. In the invention the elastomeric flapper valve portion 124 is of a substantially lesser mass, as compared to the prior art valving members, and therefore is less sensitive to the effects of such induced vibrations. A related problem of the steel valve member design of the prior art pressure regulators is that noise problems are generated as a consequence of such steel valve members responding to induced vibrations; such noise problems are effectively eliminated by the relatively low durometer of the elastomeric flapper valve portion 124.

The metal disk 142 may be integrally molded with and into member 85, if desired thereby saving the time and cost of a separate operation of inserting the disk 142 into a separately molded member 85.

Even though the invention has been disclosed and described with reference to its use as a fuel pressure regulator, its uses are, of course, not so limited and the regulator of the invention may be employed for regulating the pressure of any desired fluid.

Although only a preferred embodiment of the invention has been disclosed and described, it is apparent that other embodiments and modifications of the invention are possible within the scope of the appended claims.

What is claimed is:

1. A pressure regulator for a fluid, comprising two distinct and variable chamber means separated by wall means therebetween, said wall means comprising pressure responsive movable wall means, variably positionable valve actuator means, inlet valve means movable to and from opened and closed positions for controlling the flow of said fluid into a first of said two chamber means, passage means for communicating a reference pressure to a second of said two chamber means, resilient means operatively connected to said pressure responsive movable wall means, said resilient means and said pressure responsive movable wall means at times being effective to cause said valve actuator means to in turn cause said inlet valve means to become opened, said inlet valve means comprising an elastomeric valving portion partially separated from and partially joined to an associated elastomeric supporting body structure, said valving portion being joined to said supporting body structure by an integrally formed elastomeric section, whereby when said valving portion is moved to and from said opened and closed positions said valving portion undergoes a hinged-like motion generally about said integrally formed elastomeric section, a valve seat member, and a fluid inlet passage formed through said valve seat member, said valve seat member comprising a generally flat valve seating surface generally circumscribing said fluid inlet passage, and wherein when said valving portion is in said closed position said valving portion is in fluid sealing relationship with said valve seating surface as to thereby terminate the flow of said fluid through said inlet pasage and into said first chamber means.

2. A pressure regulator for a fluid, comprising two distinct and variable chamber means separated by wall means therebetween, said wall means comprising pressure responsive movable wall means, variably positionable valve actuator means, inlet valve means movable to and from opened and closed positions for controlling the flow of said fluid into a first of said two chamber means, passage means for communicating a reference pressure to a second of said two chamber means, resilient means operatively connected to said pressure responsive movable wall means, said resilient means and said pressure responsive movable wall means at times being effective to cause said valve actuator means to in turn cause said inlet valve means to become opened, said inlet valve means comprising an elastomeric valving portion partially separated from and partially joined to an associated elastomeric supporting body structure, said valving portion being joined to said supporting body structure by an integrally formed elastomeric section, whereby when said valving portion is moved to and from said opened and closed positions said valving portion undergoes a hinged-like motion generally about said integrally formed elastomeric section, wherein said valve actuator is operatively carried by said pressure responsive wall means for movement in unison with said pressure responsive wall means, abutment means, said abutment means being operatively carried by said pressure responsive wall means for movement in unison with said pressure responsive wall means and effective to limit the movement of both said pressure responsive wall means and said valve actuator to thereby correspondingly limit the degree to which said valving portion may be opened, a valve seat member, and a fluid inlet passage formed through said valve seat member, said valve seat member comprising a generally flat valve seating surface generally circumscribing said fluid inlet passage, wherein when said valving portion is in said closed position said valving portion is in fluid sealing relationship with said valve seating surface as to thereby terminate the flow of said fluid through said inlet passage and into said first chamber means, and wherein said resilient means comprises spring means situated in said second chamber means.

3. A pressure regulator for a fluid, comprising two distinct and variable chamber means separated by wall means therebetween, said wall means comprising pressure responsive movable wall means, variably positionable valve actuator means, inlet valve means movable to and from opened and closed positions for controlling the flow of said fluid into a first of said two chamber means, passage means for communicating a reference pressure to a second of said two chamber means, and resilient means operatively connected to said pressure responsive movable wall means, said resilient means and said pressure responsive movable wall means at times being effective to cause said valve actuator means to in turn cause said inlet valve means to become opened, said inlet valve means comprising an elastomeric valving portion partially separated from and partially joined to an associated elastomeric supporting body structure, said valving portion being joined to said supporting body structure by an integrally formed elastomeric section, whereby when said valving portion is moved to and from said opened and closed positions said valving portion undergoes a hinged-like motion generally about said integrally formed elastomeric section, wherein said elastomeric supporting body structure is of a thin plate-like configuration, wherein said elastomeric valving portion is a thin plate-like configuration, wherein said elastomeric valving portion comprises an integrally formed wall portion extending generally transversely thereof, said integrally formed wall portion comprising a portion of an annular recess, wherein said elastomeric valving portion partially separated from said elastomeric supporting body structure by an elongated slot formed through said supporting body structure in an peripherally outwardly of said integrally formed wall, said elongated slot terminating in first and second ends spaced from each other, and wherein that portion of said integrally formed wall portion and of said elastomeric supporting body structure generally between said first and second ends comprises said integrally formed elastomeric section about which said valving portion undergoes said hinged-like motion.

4. A pressure regulator according to claim 3 wherein said thin plate-like configuration of said supporting body structure is disk-like.

5. A pressure regulator according to claim 3 wherein said thin plate-like configuration of said elastomeric valving portion is disk-like.

6. A pressure regulator according to claim 3 and further comprising spring means, said spring means operatively engaging said elastomeric valving portion and effective to resiliently urge said elastomeric valving portion toward said closed position.

7. A pressure regulator according to claim 3 and further comprising an end wall integrally formed with said integrally formed wall portion in a manner as to form a portion of said annular recess, and a rigid member received in said annular recess as to extend across said end wall.

8. A pressure regulator according to claim 7 and further comprising spring means, spring pilot means carried by said integrally formed end wall and effective to pilot an end of said spring means, and wherein said spring means is effective to resiliently urge said elastomeric valving portion toward said closed position.

9. A pressure regulator according to claim 7 and further comprising aperture means formed partially through said elastomeric valving portion as to be in communication with said annular recess, said aperture means providing an access opening to expose a portion of said rigid member, and wherein said valve actuator in moving said elastomeric valving portion toward an open position acts against said exposed portion of said rigid member.

10. A pressure regulator according to claim 3 and further comprising a valve seat member, a fluid inlet passage formed through said valve seat member, said valve seat member comprising a generally flat valve seating surface generally circumscribing said fluid inlet passage, and wherein when said valving portion is in said closed position said valving portion is in fluid sealing relationship with said valve seating surface as to thereby terminate the flow of said fluid through said inlet passage and into said first chamber means, and wherein said valve seat member serves to maintain said elastomeric valving portion in operating position by clamping against said elastomeric supporting body structure.

11. A pressure regulator for a fluid. comprising two distinct and variable chamber means separated by wall means therebetween, said wall means comprising pressure responsive movable wall means, variably positionable valve actuator means, inlet valve means movable to and from opened and closed positions for controlling the flow of said fluid into a first of said two chamber means, passage means for communicating a reference pressure to a second of said two chamber means, and resilient means operatively connected to said pressure responsive movable wall means, said resilient means and said pressure responsive movable wall means at times being effective to cause said vlave actuator means to in turn cause said inlet valve means to become opened, said inlet valve means comprising an elastomeric valving portion having a mid-point and being partially separated from and partially joined to an associated elastomeric supporting body structure, said valving portion being joined to said supporting body structure by integrally formed elastomeric hinging means, wherein hinging means is located entirely to one side of said mid-point and wherein said valving point is completely separated from said supporting body structure along at least the entire side of said valving portion which is opposite to said one side, whereby when said valving portion is moved to and from said opened and closed positions said valving portion undergoes a hinged-like motion generally about said integrally formed elastomeric hinging means.

* * * * *

UNITED STATES PATENT AND TRADEMARK OFFICE
CERTIFICATE OF CORRECTION

PATENT NO. : 4,660,597

DATED : April 28, 1987

INVENTOR(S) : Warren H. Cowles et al.

It is certified that error appears in the above—identified patent and that said Letters Patent is hereby corrected as shown below:

Cover page, change "Warren H. Cowles, Farmington Hills, Mich." to read ---Warren H. Cowles, Farmington Hills, Mich. and Jerry A. Sowik, Detroit, Mich.---

Signed and Sealed this

Thirteenth Day of October, 1987

Attest:

DONALD J. QUIGG

Attesting Officer

Commissioner of Patents and Trademarks